United States Patent
Agarwal et al.

(10) Patent No.: US 10,348,744 B2
(45) Date of Patent: Jul. 9, 2019

(54) STATEFUL BACKEND DRIVERS FOR SECURITY PROCESSING THROUGH STATELESS VIRTUAL INTERFACES

(71) Applicant: NXP USA, Inc., Austin, TX (US)

(72) Inventors: Vineet Kumar Agarwal, Telangana (IN); Rajeshkumar Kulandaisamy, Telangana (IN); Nitin K. Parikh, Telangana (IN)

(73) Assignee: NXP USA, Inc., Austin, TX (US)

( * ) Notice: Subject to any disclaimer, the term of this patent is extended or adjusted under 35 U.S.C. 154(b) by 231 days.

(21) Appl. No.: 15/381,468

(22) Filed: Dec. 16, 2016

(65) Prior Publication Data

US 2018/0176233 A1   Jun. 21, 2018

(51) Int. Cl.
*G06F 11/00*    (2006.01)
*H04L 29/06*    (2006.01)
*G06F 9/455*    (2018.01)

(52) U.S. Cl.
CPC ...... *H04L 63/1416* (2013.01); *G06F 9/45558* (2013.01); *H04L 63/20* (2013.01); *G06F 2009/4557* (2013.01); *G06F 2009/45587* (2013.01)

(58) Field of Classification Search
CPC ............. H04L 63/1416; G06F 9/45558; G06F 2009/4557; G06F 2009/45587
USPC ........................................................ 726/23
See application file for complete search history.

(56) References Cited

U.S. PATENT DOCUMENTS

| | | | |
|---|---|---|---|
| 2012/0173654 A1* | 7/2012 | Tsao | G06Q 30/02 709/213 |
| 2013/0091350 A1* | 4/2013 | Gluck | H04L 63/0281 713/153 |
| 2014/0258533 A1* | 9/2014 | Antony | H04L 29/08144 709/226 |

OTHER PUBLICATIONS

M. Jones, "Virtio: An I/O Virtualization Framework for Linux Paravirtualized I/O With KVM and Iguest", IBM, Developer Works, 9 pgs. (Jan. 2010).
Russell, "Virtio: Towards a De-Facto Standrrd for Virtual I/O Devices" IBM, 9 pgs. (Jul. 2008).

* cited by examiner

*Primary Examiner* — Mohammad W Reza (57) ABSTRACT

Methods and systems are disclosed for stateful backend drivers for security processing through stateless virtual interfaces within virtual machine (VM) host servers. A security application runs within a hosted VM, and a header is stored for the security application that includes a host backend identifier (BID). The VM sends a security processing request including the header through a stateless virtual interface to a backend driver. The backend driver compares the host BID within the processing request to host BIDs associated with the VM host server. If a match is found, security processing request is performed using one or more security engines within the VM host server. If a match is not found, the VM is identified as a migrated VM, and the header is updated to store a host BID associated with the VM host server. A timestamp for virtual queue creation is preferably used for the host BID.

20 Claims, 5 Drawing Sheets

STATEFUL BACKEND DRIVERS FOR SECURITY PROCESSING THROUGH STATELESS VIRTUAL INTERFACES

TECHNICAL FIELD

This technical field relates to security processing for network communications and, more particular, to security processing within virtual processing environments.

BACKGROUND

Virtual processing environments often include one or more virtual machines (VMs) operating within a virtualization layer operating within a VM host server. Generic virtual interfaces have been developed to facilitate communications with such VMs and to allow VMs to migrate from one VM host server to another VM host server. Virtio is one generic virtual interface that has been developed for Linux based systems and related virtualization layers. Virtio-PCI is a virtual PCI (peripheral component interface) interface that is part of the Virtio virtual interface that can be used to communicate with applications running within VMs. Virtio-PCI virtual interfaces are designed as stateless interfaces. As such, when a VM including a Virtio-PCI based emulated device is migrated from one platform to other: (1) the Virtio-PCI device can continue to work seamlessly, and (2) processing can be resumed without any disruption in a service that is implemented using the Virtio-PCI virtual interface. However, this operation requires that the Virtio-PCI based emulated device be stateless, so that Virtio backend drivers on the new VM host server can continue processing requests associated with the migrated VM.

Security processing for network communications is used in a variety of environments. Security processing acceleration is used where certain security tasks for security applications are performed by separate security engines to improve processing efficiency. For security processing acceleration, a security context is typically created within the hardware accelerator by providing security parameters such as security protocols, security keys, security processing algorithms, and/or other security information during connection set up. This security context creates a stateful solution as the hardware accelerator keeps track of the security context as an initialization vector. This security information can also be cached as part of the hardware security context in order to avoid the requirement of passing the same security parameters (e.g., security protocol, security keys, security processing algorithms, etc.) with every processing request.

However, where security processing acceleration is desired for virtual processing environments using stateless virtual interfaces, such as Virtio-PCI, the stateful tracking of the hardware security context does not work when VMs migrate to new VM host servers. For example, assuming a VM includes a security application that is using a security engine within the VM host server for security processing acceleration, the security application will pass security parameters (e.g., security protocol, security key, security processing algorithms, etc.) along with data for the security processing operations through a Virtio-PCI frontend driver to a Virtio-PCI backend driver within the VM host server. If it is assumed that the VM will not migrate from the VM host server, these security parameters need not be passed to the backend driver along with every processing request. However, to support live migration of the VM to other VM host servers, these security parameters would need to be passed along to the backend drivers with every packet to be processed because the Virtio-PCI virtual interface is stateless. Without passing these security parameters in each request, a security engine within the new VM host server would not have the security context information it needs to perform the security processing.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Methods and systems are disclosed for stateful backend drivers for security processing through stateless virtual interfaces within virtual machine (VM) host servers. For disclosed embodiments, a VM host server hosts a virtual machine (VM), a stateless virtual interface, and a backend driver for the stateless virtual interface within a VM host server. A security application runs within the VM, and a header is stored within the VM that is associated with the security application and includes a host backend identifier (BID). One or more security engines operate within the VM host server. The VM sends a security processing request through the stateless virtual interface to the backend driver, and the security processing request includes the header. The backend driver compares the host BID within the processing request to one or more host BIDs associated with the VM host server. If a match is found, the security processing request is performed using the one or more security engines within the VM host server. If a match is not found, the VM is identified as a migrated VM, a security context is initialized with the hardware security engine, and the header is updated to store a host BID associated with the VM host server. The security processing request is also performed using the one or more security engines within the VM host server. As the uniqueness of host BID across different VM servers helps increase the accuracy of detection of migration of a VM, a timestamp of virtual queue creation for the virtual interface is one preferred parameter to include in the host BID. A variety of additional or different features and variations can also be implemented.

In operation, the disclosed embodiments improve the efficiency of security processing acceleration by using stateful backend drivers for stateless virtual interfaces to support live migration of VMs to different VM host servers. As described herein, a backend driver can avoid new context creation within hardware security engines for every security processing request by identifying ownership of the VM requesting the security processing. To achieve this result, the backend driver writes information to a command header for the VM when a new connection is created. This information includes a unique backend identifier (BID) associated with the VM host server along with security information for the VM. For certain embodiments, the security information is stored as an opaque data type within the VM. In addition, the unique host backend identifier (BID) can be implemented as a timestamp associated with the creation of virtual queues for communications through the stateless virtual interface between the frontend driver for the VM and the backend driver. As such, the host BID can be different for every VM hosted within a VM host server. The unique host BID is then included within processing requests sent by the VM, and the backend driver checks for ownership of the VM session and related security context by comparing the host BID within the processing request to the host BIDs for the particular VM host server. If there is a match, the backend driver owns the VM session, and the backend driver uses stored security information to identify the hardware security context and processes the request through one or more security engines. If there is no match, the backend driver does not own the VM session and assumes that the VM session has migrated to the VM host server. The backend driver then creates a new hardware security context within the security engine, updates the unique host BID by writing new information to the command header for the migrated VM, creates the new hardware security context within the security engine, and processes the request using the security engines.

Figure 1:
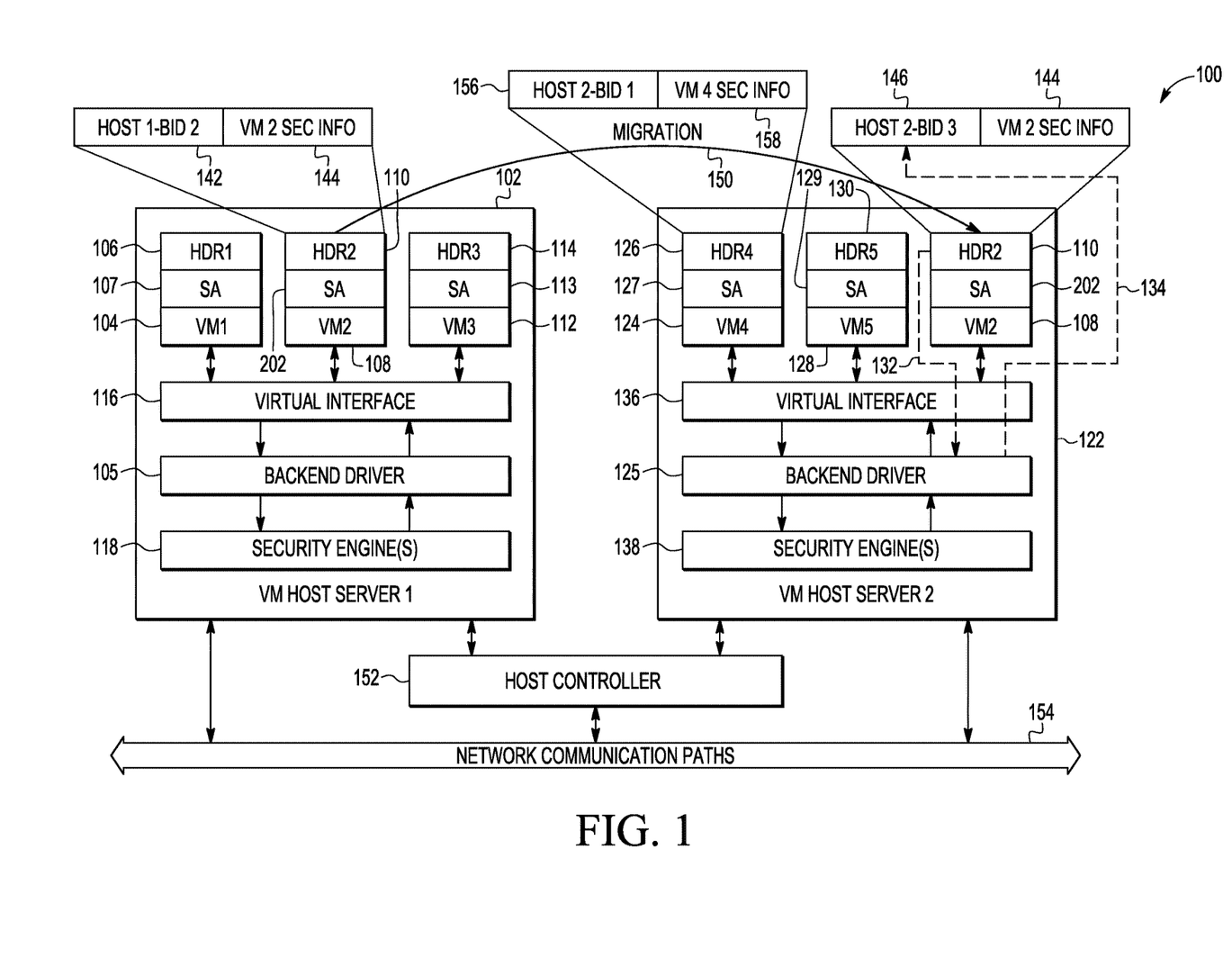
FIG. 1 is a diagram of an example embodiment for a virtual processing environment where stateful migration for a virtual machine (VM) from one VM host server to a different VM host sever is provided through information stored within a header associated with a security application.

FIG. 1 is a diagram of an example embodiment for a virtual processing environment 100 where stateful migration for a VM 108 from one VM host server 102 to a different VM host sever 122 is provided through information stored within a header 110 associated with a security application 202. The virtual processing environment 100 includes a first VM host server 102, a second VM host server 122, and a host controller 152 that communicate with each other through network communication paths 154 and/or other communication paths. For the example embodiment, a second VM (VM2) 108 is migrated from the first VM host server 102 to the second VM host server 122 as indicated by arrow 150. As described in more detail below, the VM host servers 102/122 write host BIDs 142/146 into the header 110 for the second VM 108, and these host BIDs 142/146 are then used by the backend drivers 105/125 within the VM host servers 102/122 to identify ownership of VM security sessions and newly migrated VMs. The header 110 also stores security application information (VM2 SEC INFO) 144 for the second VM, and this security information 144 includes one or more security parameters associated with the security application 202 that are used by the security engines 118/138 to provide uninterrupted security processing and thereby stateful migration for the second VM 108.

It is noted that the security application 202 can be a wide variety of applications that apply one or more security features to network traffic being communicated with the VMs 104/108/112/124/128 within the VM host servers 102/122 and/or through the network communications paths 154. The security features can include application of one or more security algorithms for security processing such as IP (internet protocol) security processing, PDCP (packet data convergence protocol) layer security processing, RLC (radio link control) layer security processing, and/or other network packet related security processing. It is noted that per application stateful security parameters, such as sequence number that are assigned by the security application to every packet, can also be provided along with every packet processing request. The security engines 118/138 can be configured to offload one or more processing tasks associated with these security features from the security applications 202 operating with the VMs 104/108/112/124/128.

Looking more particularly to the first host server 102, a plurality of VMs 104/108/112 are hosted by the first host server 102. The first VM (VM1) 104 stores a first header (HDR1) 106; the second VM (VM2) 108 stores a second header (HDR2) 110, and a third VM (VM3) 112 stores a third header (HDR3) 114. The VMs 104/108/112 operate security applications 107/202/113 that communicate with one or more security engines 118 through a stateless virtual interface 116, such as a Virtio-PCI virtual interface, and a backend driver 105 for this stateless virtual interface 116. The security engines 118 accelerate security processing of network packet traffic by offloading one or more processing tasks from the security applications 107/202/113 for the VMs 104/108/112. The security engines 118 use security parameters (e.g., security protocol, security key, security processing algorithms, etc.) stored as security context information to facilitate this security processing. During interface initialization, the backend driver 105 writes a host BID that uniquely identifies itself into the headers 106/110/114. As shown with respect to the second header (HDR2) 110, the host BID (HOST1-BID2) 142 associated with the first VM host server is stored along with security information (VM2 SEC INFO) for the second VM 108 in the second header (HDR2) 110. Although not shown, each of the other headers 106 and 114 also store a host BID associated with the first VM host server 102 along with security information associated with its respective VM 104/112.

Looking now to the second host server 122, a plurality of VMs 124/128 are hosted by the second host server 122. The fourth VM (VM4) 124 stores a fourth header (HDR4) 126, and a fifth VM (VM5) 128 stores a fifth header (HDR5) 130. The VMs 124/128 operate security applications 127/129 that communicate with one or more security engines 138 through a stateless virtual interface 136, such as a Virtio-PCI virtual interface, and a backend driver 125 for this stateless virtual interface 136. The security engines 138 accelerate security processing of network packet traffic by offloading one or more processing tasks from the security applications 127/129 for the VMs 124/128. The security engines 138 use security parameters (e.g., security protocol, security key, security processing algorithms, etc.) stored as security context information to facilitate this security processing. Further, the security engines 138 write a host BID 146 associated with the second VM host server 122 into the headers 126/130. As shown, the header 126 also stores a host BID (HOST2-BID1) 156 associated with the second VM host server 122 along with security information associated with the fourth VM (VM4) 124. Although not shown, the header 130 also stores a host BID associated with the second VM host server 122 along with security information associated with the fifth VM (VM5) 128.

With respect to the second VM (VM2) 108 once it has migrated to the second VM host server 122, the second header (HDR2) 110 will initially include the BID (HOST1-BID2) 142 and the security information (VM2 INFO) 144 for the second VM 108. As indicated by dashed line 132, the backend driver 125 will receive a processing request from the security application 202 operating within the second VM (VM2) 108. The second header (HDR2) 110 will be included with this processing request, and the backend driver 125 will identify that the second VM (VM2) 108 is a newly migrated VM because the host BID 142 associated with first VM host server 102 will not match a host BID associated with the second VM host server 122. As indicated by dashed line 134, the backend driver 125 will then write a host BID 146 associated with the second VM host server 122 to the second header (HDR2) 110. The second header (HDR2) 110 for the migrated second VM (VM2) 108 will then include the host BID (HOST2-BID3) 146 associated with the second VM host server 122 along with the security information (VM2 SEC INFO) 144 for the second VM 108. As such, the backend driver 125 is able to recognize a newly migrated VM 108 by analyzing the host BID (HOST1-BID2) 142 initially stored in the header 110, to write the new host BID (HOST2-BID3) 146 into the header 110, to store security context information within the security engines 138 using the security information 144 for the second VM 108 that is also stored in the header 110, and to process the security processing request using the security engines 138.

It is noted that the migration 150 can be controlled, for example, by the host controller 152 based upon one or more events, such as for example, overloading of the first VM host server 102 and/or available processing resources on the second VM host server 122. It is also noted that the network communication paths 154 can include wired network connections, wireless network connections, or a combination of wired and wireless network connections. Further, one or more intervening network devices can also be included within the network communication paths 154, such as for example, one or more routers, switches, gateways, and/or other network connected devices. In addition, one or more network communication protocols can also be used to communication network packets through the network communications paths 154. Other variations could also be implemented.

Figure 2:
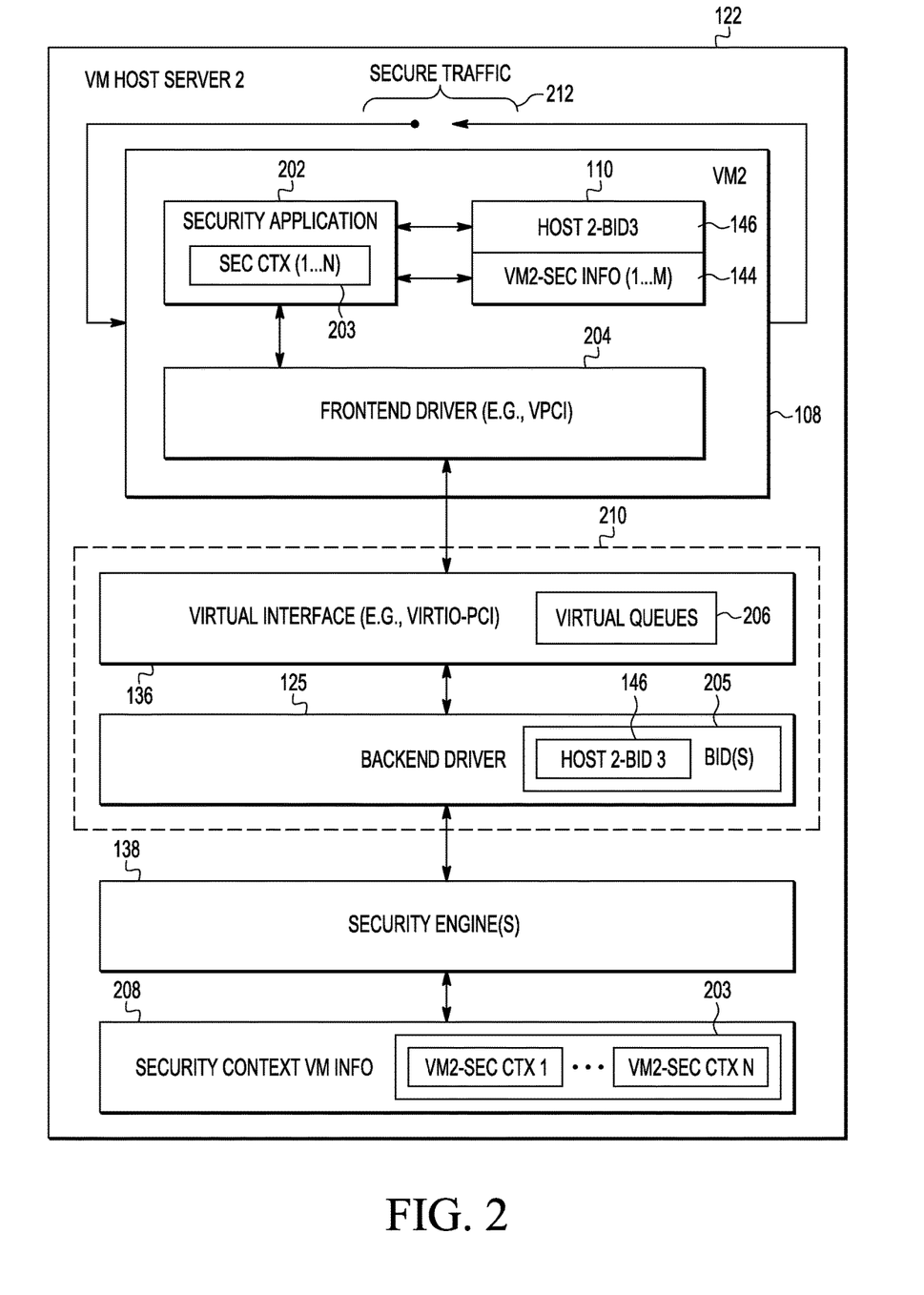
FIG. 2 is a diagram of an example embodiment for a VM that has migrated and is now operating within different VM host server.

FIG. 2 is a diagram of an example embodiment for the second VM (VM2) 108 operating within the second host server 122. A security application 202 operates within the second VM 108 along with a frontend driver 204 for the stateless virtual interface 136, and the security application 202 communicates with security engines 138 through frontend driver 204, stateless virtual interface 136, and backend driver 125. During operation, the security application 202 has one or more security contexts (e.g., SEC CTX 1 . . . N) 203 associated with its security processing. The security application 202 stores security information (VM2 SEC INFO) 144 associated with the second VM 108, for example, within one or more data registers. The security information 144 can include one or more security parameters (e.g., 1 . . . M) such as security protocols, security keys, security processing algorithms, and/or other security information. The virtual interface 136 is configured to be a generic stateless virtual interface to allow for easy of connection to and migration of VMs. The frontend driver 204 is a virtual driver that operates as part of the second VM 108 to provide a communication interface between the security application 202 and the stateless virtual interface 136. The backend driver 125 is a virtual driver that operates as part of the host server 122 to provide a communication interface between the security engines 138 and the stateless virtual interface 136. The backend driver 125 can also initialize one or more virtual queues 206 as part of the stateless virtual interface 136 to facilitate communications between the frontend driver 204 and the backend driver 125 through the stateless virtual interface 136. The stateless virtual interface 136, for example, can be a Virtio-PCI virtual interface, and the frontend driver 204 and the backend driver 125 can be virtual PCI drivers that communication through the Virtio-PCI interface using the virtual queues 206. Further, the stateless virtual interface 136 and the backend driver 125 can be configured to operate within a virtualization layer 210 for the second VM host server 122, such as a Linux virtualization layer. During operation, the security application 202 receives, processes, and transmits secure traffic 212 to one or more other VMs operating within the same VM host server, through the network communication paths 154, and/or through one or more other network communication paths. The security engines 138 are used to accelerate this security processing for the security applications 202. It is also noted that the other VMs 104/112/124/128 described herein can be configured to operate similarly to the second VM 108, and it is noted that the first VM host server 102 can be configured to operate similarly to the second VM host server 122. Variations can also be implemented while still taking advantage of the stateful backend drivers for stateless virtual interfaces described herein.

As described herein, the backend driver 125 generates and stores one or more host BIDs 205 associated with the second VM host server 122 for VMs operating within the second host server 122. The backend driver 125 also updates the host BID 142 associated with the first VM host server 102 when the second VM 108 migrates to the second VM host server 122. The security application 202 sends processing requests including a host BID (e.g., initially the first host BID 142 before being updated to be the second host BID 146) from the header 110 to the security engines 138 through the frontend driver 204 and the stateless virtual interface 136 to the backend driver 125. The processing request also carries the security information 144 for the second VM 108, and the backend driver 125 uses this security information 144 to store security context VM information 208 for the hardware security engines 138. The security context VM information 208 includes one or more security contexts (VM2 SEC CTX 1 . . . VM2 SEC CTX N) 203 for security processing associated with processing requests from the security application 202 running within the second VM host server 122. The backend driver 125 compares the host BID in the received header for each processing request (e.g., initially the first host BID 142 before being updated to be the second host BID 146) with host BIDs 203 associated with the second VM host server 122. If there is a match, the backend driver 125 accesses the security context and processes the request. If there is no match, the backend driver 125 assumes that that VM has migrated from another host, creates a new security context within the security engines 138, generates a host BID associated with the second VM host server 122 (e.g., the host BID 146), updates the host BID stored by the second VM 108 within the command header 110, and processes the security processing request.

It is noted that the host BIDs, such as host BIDs 142/146/156, used by the backend drivers 105/125 for the VM host servers 102/122 are configured to be unique identifiers. Further these host BIDs can be generated in a variety of ways to provide for unique identifiers that distinguish the backend drivers 105/125 for the VM host servers 102/122 across which migration can occur. For example, a set of unique numbers can be generated and assigned to the backend drivers 105/125. As another example, the backend drivers 105/125 can use a timestamp generated when the virtual queues 206 are formed for a VM and related frontend driver that are connected to the backend driver 105/125. During live migration, a new VM instance will be created for the migrated VM, such as VM 108 in the embodiments of FIGS. 1-2 described above. The timestamp for new virtual queues 206 generated for this new VM will not match the timestamp for the prior VM, and therefore a comparison of the timestamps will reveal that the VM has migrated and was not previously owned by the backend driver 125. It is also noted that the backend drivers 105/125 can clean up old and unused security contexts for VMs migrating to other VM host servers during delete requests and/or when VM instances are closed during migration.

Figure 3:
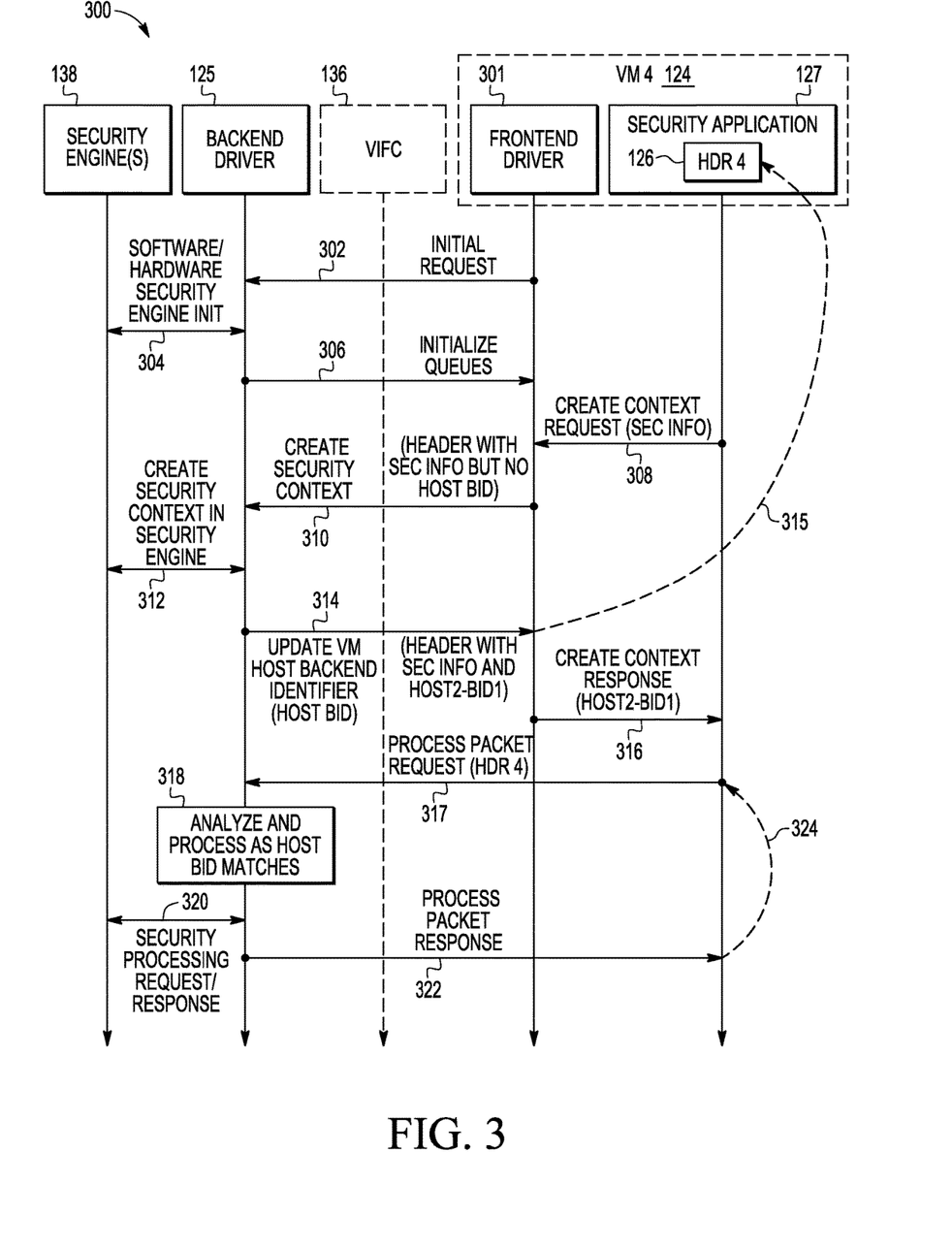
FIG. 3 is a swim lane diagram of an example embodiment where security processing is performed for a VM that was initialized and stayed within a single VM host server.

FIG. 3 is a swim lane diagram of an example embodiment 300 where security processing is performed for the fourth VM (VM4) 124 that has stayed within the second VM host server 122. As indicated by arrow 302, a frontend driver 301 for the fourth VM 124 sends an initial processing request to the backend driver 125 through the stateless virtual interface 136. As indicated by arrow 304 the backend driver 125 communicates with the security engines 138 to initialize software and hardware resources within the security engines 138 to provide security processing. As indicated by arrow 306, the backend driver then communicates with the frontend driver 301 to initialize virtual queues within the virtual interface 136. A described herein, a timestamp associated with this creation of virtual queues can be used as the host BID that will be later stored in the header (HDR4) 126. As indicated by arrow 308, the security application 127 then sends a request to create a security context to the frontend driver 301, and this request includes security information for the fourth VM 124 that is stored within the fourth header 126. As described herein, this security information can include one or more security parameters (e.g., security protocols, security keys, security processing algorithms, and/or other security information). As indicated by arrow 310, the frontend driver 301 communicates with the backend driver 125 to provide the security context creation request, and these messages include a header having the security information but not the host BID. As indicated by arrow 312, the backend driver 125 communicates with the security engines 138 to create the security context for the security engines 138. As indicated by arrow 314, the backend driver 125 communicates with the frontend driver 301 to update the VM host backend identifier (host BID) as indicated by dashed line 315. These messages include a header having the host BID (HOST2 BID1) 156 associated with the second VM host server 122 as well as the security information. As a result of this update, the host BID 156 associated with the second VM host server 122 is now stored in the fourth header (VM4) 126. As indicated by arrow 316, a response for the create context request is also sent from the frontend driver 301 to the security application 127.

As indicated by arrow 317, the security application 127 then sends a packet processing request with the header 126 to the backend driver 125 through the frontend driver 301 and the stateless virtual interface 136. As indicated by block 318, the backend driver 125 analyzes the header 126 within the processing request, determines that the host BID within the header 126 matches the host BID 156 associated with the second VM host server 122, and processes the request. As indicated by arrow 320, the backend driver 125 communicates request/response messages with the security engines 138 to perform the requested security processing. As indicated by arrow 322, the backend driver 125 then sends response messages for the process packets requests to the security application 127 through the virtual interface 136 and the frontend driver 301. The processing request/response communications can continue for additional packets as indicated by dashed line 324. It is also noted that the other VMs 104/108/112/128 can be configured to operate similarly to the fourth VM 124, and it is noted that the first VM host server 102 can be configured to operate similarly to the second VM host server 122. Other variations could also be implemented while still taking advantage of the stateful backend drivers for stateless virtual interfaces described herein.

Figure 4:
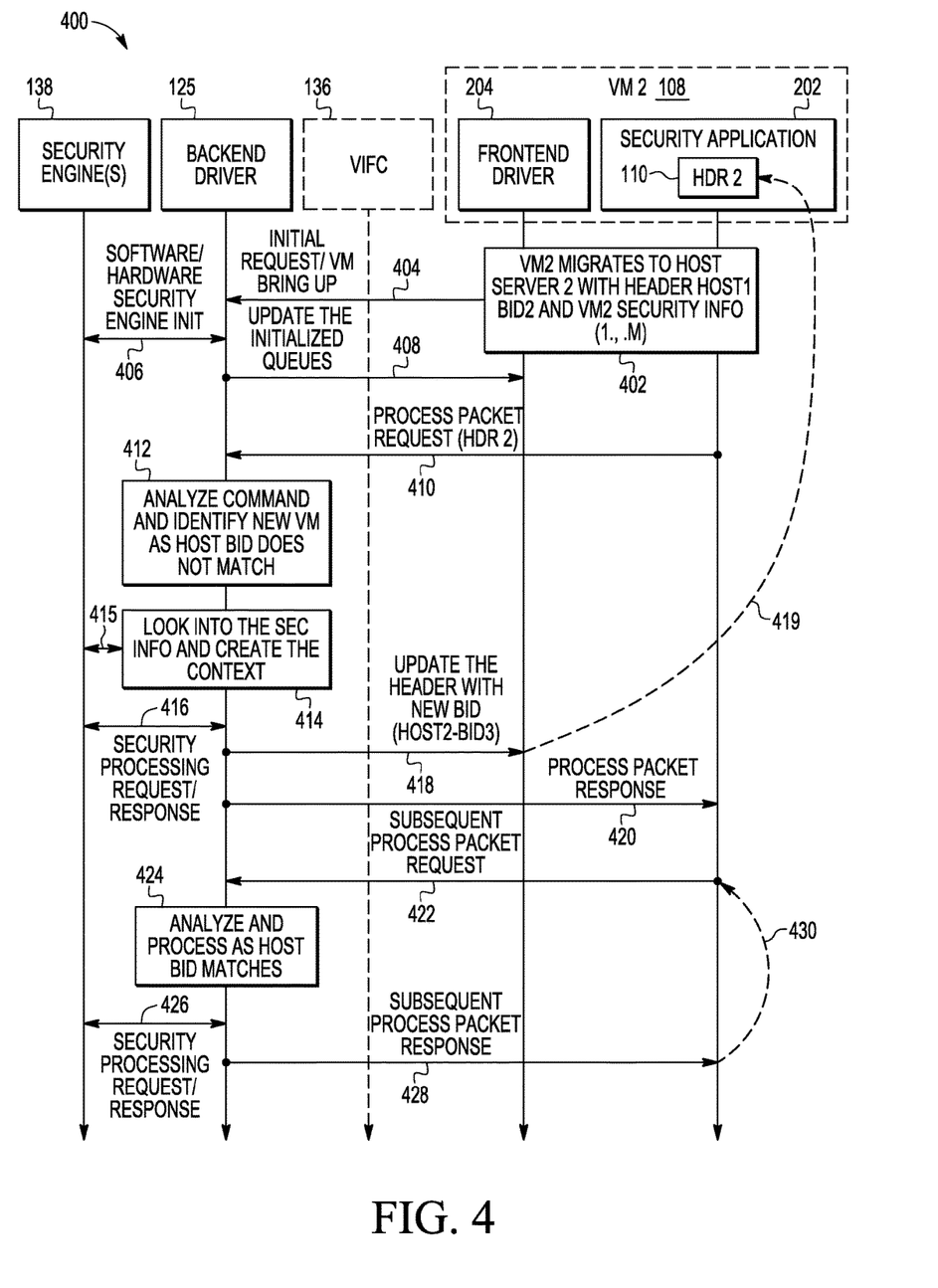
FIG. 4 is a swim lane diagram of an example embodiment where security processing is performed for a VM that has migrated to a different VM host server.

FIG. 4 is a swim lane diagram of an example embodiment 400 where security processing is performed for the second VM (VM2) 108 after it has migrated to the second VM host server 122. Initially, as indicated by block 402, the second VM 108 migrates to the second host server 122 with the header 110 storing the host BID (HOST1-BID2) 142 associated with the first VM host server 102. The header 110 will also include one or more parameters (e.g., security protocols, security keys, security processing algorithms, and/or other security information) for the second VM 108 that were earlier written as security information 144 for the second VM into header 110. As indicated by arrow 404, the migration of the second VM 108 causes the second VM host server 122 to bring up a new VM, and an initial queue setup request is sent from the second VM 108 to the backend driver 125. As indicated by arrow 406, the backend driver 125 communicates with the security engines 138 to initialize software and hardware resources within the security engines 138 to provide security processing. As indicated by arrow 408, the backend driver then communicates with the frontend driver 204 to initialize virtual queues within the virtual interface 136. A described herein, a timestamp associated with this creation of virtual queues can be used as the host BID that will be later stored in the header (HDR2) 110.

As indicated by arrow 410, the security application 202 then sends a packet processing request with the header 110 to the backend driver 125 through the frontend driver 204 and the stateless virtual interface 136. This header 110 still includes the host BID 142 associated with the first VM host server 102. As indicated by block 412, the backend driver 125 analyzes the header 110 within the processing request and determines that the host BID within the header 110 does not match host BIDs associated with the second VM host server 122. As indicated by block 414 and arrow 415, the backend driver 125 looks into the security information 144 stored in the header 110 and then uses this security information 144 to create the security context within the security engines 138. As indicated by arrow 416, the backend driver 125 communicates request/response messages with the security engines 138 to perform requested security processing. As indicated by arrow 418, the backend driver 125 communicates with the frontend driver 204 to update the VM host backend identifier (host BID) as indicated by dashed line 419. These messages include a header with the host BID (HOST2-BID3) 146 associated with the second VM host server 122. As a result of this update, the host BID 146 associated with the second VM host server 122 is stored in the second header (VM2) 110. As indicated by arrow 420, the backend driver 125 also sends response messages for the process packets requests to the security application 202 through the virtual interface 136 and the frontend driver 301.

As indicated by arrow 422, the security application 202 then sends a subsequent packet processing request with the header 126 to the backend driver 125 through the frontend driver 204 and the stateless virtual interface 136. As indicated by block 424, the backend driver 125 analyzes the header 110 within the processing request, determines that the host BID within the header 110 matches the host BID 146 associated with the second VM host server 122, and processes the request. As indicated by arrow 426, the backend driver 125 communicates request/response messages with the security engines 138 to perform the requested security processing. As indicated by arrow 428, the backend driver 125 then sends response messages for the process packets requests to the security application 202 through the virtual interface 136 and the frontend driver 204. The processing request/response communications can continue for additional packets as indicated by dashed line 430. It is also noted that the other VMs 104/112/124/128 can be configured to operate similarly to the second VM 108, and it is noted that the first VM host server 102 can be configured to operate similarly to the second VM host server 122. Other variations could also be implemented while still taking advantage of the stateful backend drivers for stateless virtual interfaces described herein.

Figure 5:
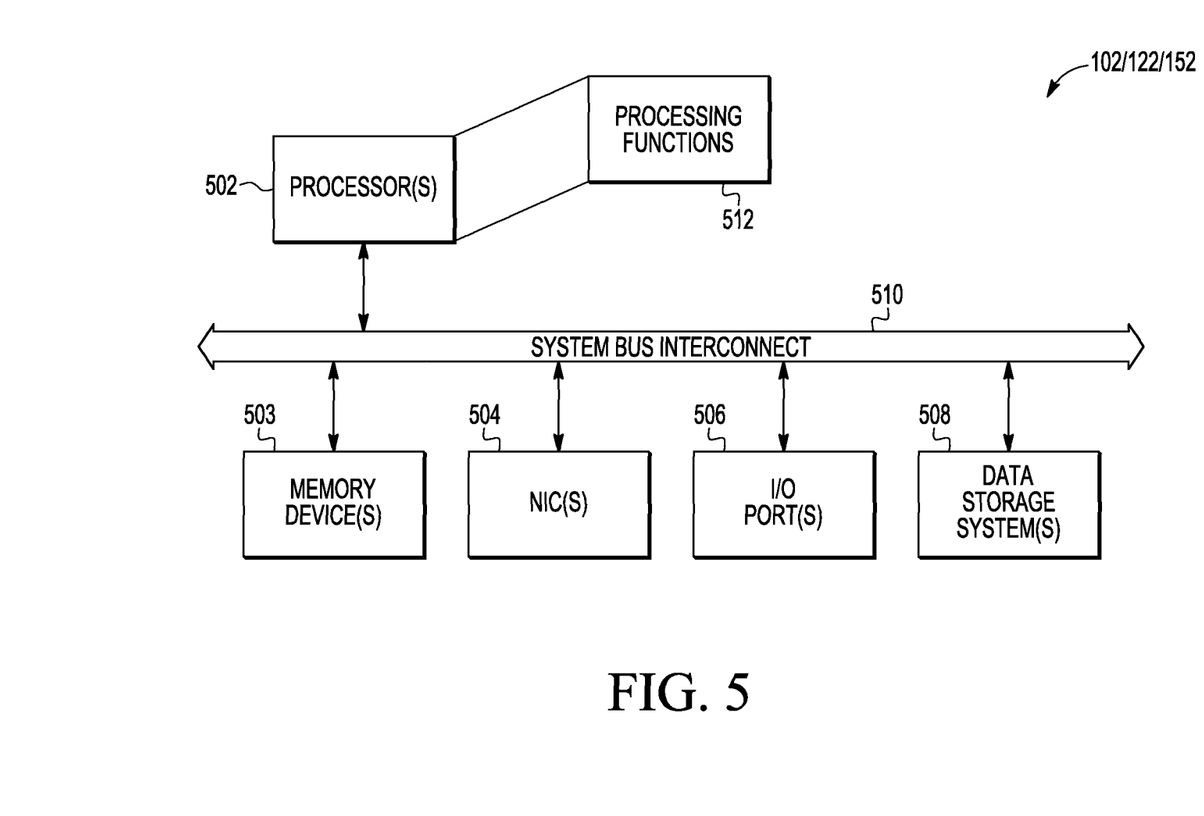
FIG. 5 is a block diagram of an example embodiment of a hardware environment for a VM host server and/or a host controller.

FIG. 5 is a block diagram of an example embodiment of a hardware environment for the first VM host server 102, the second VM host server 122, and/or the host controller 152. For the example embodiment depicted, the hardware environment includes one or more processors 502 programmed or otherwise configured to implement the one or more processing functions 512 for the embodiments described herein. The hardware environment also includes one or more network interface cards (NICs) 504, one or more input/output (I/O) ports 506, one or more data storage systems 508, and one or more memory devices 503 coupled to communicate with each other through a system bus interconnect 510. The data storage systems 508 can store one or more software modules that represent instructions that can be executed by the processors 502 to carry out the functions described herein. In operation, the processors 502 load and execute software code and/or programming instructions stored in the data storage systems 508 to perform the processing functions described herein. For example, the first VM host server 102, the second VM host server 122, and/or the host controller 152 can be implemented using software instructions that when executed by the one or more processors 502 cause the functions described herein. The memory devices 503 can be used by the processors 502 to load and execute the software instructions stored in the data storage systems 508.

It is further noted that different and/or additional components could also be used to implement the first VM host server 102, the second VM host server 122, and/or the host controller 152 while still taking advantage of the stateful migration techniques described herein. It is further noted that the system bus 510 can be implemented as multiple interconnection buses with our without additional intervening circuitry. Further, it is noted that the processors 502 can be implemented using one or more processing devices including controllers, microcontrollers, microprocessors, central processing units, hardware accelerators, configurable logic devices (e.g., field programmable gate arrays), and/or other processing devices. In addition, data storage systems 508 can be implemented as any desired non-transitory tangible computer readable medium that stores data, such as data storage devices, FLASH memory, random access memory, read only memory, programmable memory devices, reprogrammable storage devices, hard drives, floppy disks, DVDs, CD-ROMs, and/or any other non-transitory data storage mediums. The memory devices 503 can be any such data storage medium configured to maintain data storage when the network device is powered. Other variations could also be implemented.

As described herein, a variety of embodiments can be implemented and different features and variations can be implemented, as desired.

For one embodiment, a method for a virtual machine (VM) host server is disclosed including hosting a virtual machine (VM), a stateless virtual interface, and a backend driver for the stateless virtual interface within a VM host server; running a security application within the VM; storing a header within the VM where the header is associated with the security application and includes a host backend identifier (BID); operating one or more security engines within the VM host server; sending a security processing request from the VM through the stateless virtual interface to the backend driver, the security processing request including the header; and comparing, with the backend driver, the host BID within the processing request to one or more host BIDs associated with the VM host server. The method also includes, if a match is found, performing the security processing request using the one or more security engines within the VM host server; and if a match is not found, identifying the VM as a migrated VM, updating the header to store a host BID associated with the VM host server, and performing the security processing request using the one or more security engines within the VM host server.

In additional embodiments, the method includes initializing a new VM running a security application within the VM host server, and writing a host BID associated with the VM host server to a header stored within the new VM and associated with the security application. In further embodiments, the method includes sending a security processing request from the new VM through the stateless virtual interface to the backend driver where the security processing request includes the header for the new VM; comparing, with the backend driver, the host BID within the processing request to the one or more host BIDs associated with the VM host server; and when a match is found, performing the security processing request using the one or more security engines within the VM host server.

In additional embodiments, the header also stores security information about the VM and associated with the security application. In further embodiments, the method includes creating, with the backend driver, a security context for the VM with respect to the one or more security engines using the security information stored in the header. In further embodiments, the security information includes at least one of security protocols, security keys, or security processing algorithms associated with the security application.

In additional embodiments, the method includes initializing, with the backend driver, one or more virtual queues within the stateless virtual interface for communications with the VM. In further embodiments, the method includes generating, with the backend driver, a timestamp associated with the initialization of the one or more virtual queues. In further embodiments the method includes, using the timestamp as the host BID associated with the host VM server.

In additional embodiments, the method includes hosting a virtualization layer within the VM host server, operating the backend driver and the stateless virtual interface within the virtualization layer, and communicating between the VM and the stateless virtual interface using a frontend driver for the stateless virtual interface operating within the VM.

For one embodiment, a virtual machine (VM) host server is disclosed including one or more processors configured to execute instructions stored in one or more non-transitory computer readable mediums to host a virtual machine (VM) running a security application and storing a header associated with the security application, the header including a host backend identifier (BID); operate one or more security engines; provide a stateless virtual interface for communications with the VM; and provide a backend driver between the stateless virtual interface and the one or more security engines. The VM is configured to send a security processing request including the header through the stateless virtual interface to the backend virtual driver. The backend driver is configured to compare the host BID within the processing request to one or more host BIDs associated with the VM host server; if a match is found, perform the security processing request using the one or more security engines; and if a match is not found, identify the VM as a migrated VM, update the header to store a host BID associated with the VM host server, and perform the security processing request using the one or more security engines.

In additional embodiments, the one or more processors are further configured to initialize a new VM running a security application and to write a host BID associated with the VM host server to a header stored within the new VM and associated with the security application. In further embodiments, the new VM is configured to send a security processing request including the header for the new VM through the stateless virtual interface to the backend virtual driver; and the backend driver is further configured to compare the host BID within the processing request to the one or more host BIDs associated with the VM host server and, when a match is found, perform the security processing request using the one or more security engines.

In additional embodiments, the header is also configured to store security information about the VM and associated with the security application. In further embodiments, the backend server is further configured to create a security context for the VM with respect to the one or more security engines using the security information stored in the header. In further embodiments, the security information includes at least one of security protocols, security keys, or security processing algorithms associated with the security application.

In additional embodiments, the backend driver is further configured to initialize one or more virtual queues within the stateless virtual interface for communications with the VM. In further embodiments, the backend driver is further configured to generate a timestamp associated with the initialization of the one or more virtual queues. In further embodiments, the backend driver is further configured to use the timestamp as the host BID associated with the host VM server.

In additional embodiments, the one or more processors are further configured to form a virtualization layer and to operate the backend driver and the virtual interface within the virtualization layer, and the one or more processors are further configured to form a frontend driver within the VM and to communicate between the VM and the stateless virtual interface using a frontend driver.

It is further noted that the functional blocks, devices, and/or circuitry described herein can be implemented using hardware, software, or a combination of hardware and software. In addition, one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) executing software and/or firmware instructions can be used to implement the disclosed embodiments. It is further understood that one or more of the operations, tasks, functions, or methodologies described herein can be implemented, for example, as software, firmware and/or other program instructions that are embodied in one or more non-transitory tangible computer-readable mediums (e.g., data storage devices, flash memory, random access memory, read only memory, programmable memory devices, reprogrammable storage devices, hard drives, floppy disks, DVDs, CD-ROMs, and/or any other tangible data storage medium) and that are executed by one or more processing devices (e.g., central processing units (CPUs), controllers, microcontrollers, microprocessors, hardware accelerators, processors, programmable integrated circuitry, FPGAs (field programmable gate arrays), ASICs (application specific integrated circuits), and/or other processing devices) to perform the operations, tasks, functions, or methodologies described herein.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method for a virtual machine (VM) host server, comprising:
    hosting a virtual machine (VM), a stateless virtual interface, and a backend driver for the stateless virtual interface within a VM host server;
    running a security application within the VM;
    storing a header within the VM, the header being associated with the security application and including a host backend identifier (BID);
    operating one or more security engines within the VM host server;
    sending a security processing request from the VM through the stateless virtual interface to the backend driver, the security processing request including the header;
    comparing, with the backend driver, the host BID within the security processing request to one or more host BIDs associated with the VM host server;
    if a match is found, performing the security processing request using the one or more security engines within the VM host server; and
    if a match is not found, identifying the VM as a migrated VM, updating the header to replace the host BID with a host BID associated with the VM host server, and performing the security processing request using the one or more security engines within the VM host server.

2. The method of claim 1, further comprising initializing a new VM running a security application within the VM host server, and writing a host BID associated with the VM host server to a header stored within the new VM and associated with the security application.

3. The method of claim 2, further comprising:
sending a security processing request from the new VM through the stateless virtual interface to the backend driver, the security processing request including the header for the new VM;
comparing, with the backend driver, the host BID within the security processing request to the one or more host BIDs associated with the VM host server; and
when a match is found, performing the security processing request using the one or more security engines within the VM host server.

4. The method of claim 1, wherein the header also stores security information about the VM and associated with the security application.

5. The method of claim 4, wherein when a match is not found, the method further comprises creating, with the backend driver, a security context for the VM with respect to the one or more security engines using the security information stored in the header.

6. The method of claim 5, wherein the security information comprises at least one of security protocols, security keys, or security processing algorithms associated with the security application.

7. The method of claim 1, further comprising initializing, with the backend driver, one or more virtual queues within the stateless virtual interface for communications with the VM.

8. The method of claim 7, further comprising generating, with the backend driver, a timestamp associated with the initialization of the one or more virtual queues.

9. The method of claim 8, further comprising using the timestamp as the host BID associated with the host VM server.

10. The method of claim 1, further comprising hosting a virtualization layer within the VM host server, operating the backend driver and the stateless virtual interface within the virtualization layer, and communicating between the VM and the stateless virtual interface using a frontend driver for the stateless virtual interface operating within the VM.

11. A virtual machine (VM) host server, comprising:
one or more devices;
one or more processors, the one or more processors executing instructions stored in one or more non-transitory computer readable mediums to cause the one or more processors to: host a virtual machine (VM) running a security application and storing a header associated with the security application, the header including a host backend identifier (BID); operate one or more security engines; provide a stateless virtual interface for communications with the VM; and provide a backend driver between the stateless virtual interface and the one or more security engines; wherein the VM is configured to send a security processing request including the header through the stateless virtual interface to the backend virtual driver; and wherein the backend driver is further to: compare the host BID within the security processing request to one or more host BIDs associated with the VM host server; if a match is found, perform the security processing request using the one or more security engines; and if a match is not found, identify the VM as a migrated VM, update the header to replace the host BID with a host BID associated with the VM host server, and perform the security processing request using the one or more security engines.

12. The VM host server of claim 11, wherein the one or more processors are further configured to initialize a new VM running a security application and to write a host BID associated with the VM host server to a header stored within the new VM and associated with the security application.

13. The VM host server of claim 12,
wherein the new VM is configured to send a security processing request including the header for the new VM through the stateless virtual interface to the backend virtual driver; and
wherein the backend driver is further configured to compare the host BID within the security processing request to the one or more host BIDs associated with the VM host server and, when a match is found, perform the security processing request using the one or more security engines.

14. The VM host server of claim 11, wherein the header is also configured to store security information about the VM and associated with the security application.

15. The VM host server of claim 14, wherein the backend server is further configured, when a match is not found, to create a security context for the VM with respect to the one or more security engines using the security information stored in the header.

16. The VM host server of claim 15, wherein the security information comprises at least one of security protocols, security keys, or security processing algorithms associated with the security application.

17. The VM host server of claim 11, wherein the backend driver is further configured to initialize one or more virtual queues within the stateless virtual interface for communications with the VM.

18. The VM host server of claim 17, wherein the backend driver is further configured to generate a timestamp associated with the initialization of the one or more virtual queues.

19. The VM host server of claim 18, wherein the backend driver is further configured to use the timestamp as the host BID associated with the host VM server.

20. The VM host server of claim 11, wherein the one or more processors are further configured to form a virtualization layer and to operate the backend driver and the virtual interface within the virtualization layer, and wherein the one or more processors are further configured to form a frontend driver within the VM and to communicate between the VM and the stateless virtual interface using a frontend driver.

* * * * *